United States Patent
Chen et al.

(10) Patent No.: US 8,154,875 B2
(45) Date of Patent: Apr. 10, 2012

(54) POWER BANK WITH REPLACEABLE BATTERY CORE

(75) Inventors: Shih-Hui Chen, Taoyuan Hsieh (TW); Chin-Tien Lin, Taoyuan Hsieh (TW)

(73) Assignee: Tennrich International Corp., Luchu Hsiang, Taoyuan Hsieh (TW)

( * ) Notice: Subject to any disclaimer, the term of this patent is extended or adjusted under 35 U.S.C. 154(b) by 18 days.

(21) Appl. No.: 12/173,897

(22) Filed: Jul. 16, 2008

(65) Prior Publication Data

US 2010/0302743 A1    Dec. 2, 2010

(30) Foreign Application Priority Data

Oct. 19, 2007  (TW) .................................. 096217538

(51) Int. Cl.
*H05K 7/00* (2006.01)

(52) U.S. Cl. .................. 361/728; 361/796; 361/752

(58) Field of Classification Search .................. 361/752, 361/730, 790, 796, 728, 800; 312/223.1, 312/223.2; 320/107, 110–115

See application file for complete search history.

(56) References Cited

U.S. PATENT DOCUMENTS

| | | | | |
|---|---|---|---|---|
| 5,929,600 A * | 7/1999 | Hasegawa | ...................... | 320/112 |
| 6,697,259 B1 * | 2/2004 | Nakamura | ...................... | 361/752 |
| 6,943,527 B2 * | 9/2005 | Liu et al. | ...................... | 320/107 |
| 7,088,075 B2 * | 8/2006 | Baba et al. | ...................... | 320/112 |
| 7,379,296 B1 * | 5/2008 | Huang | ...................... | 361/679.41 |
| 7,433,182 B2 * | 10/2008 | Fan | ...................... | 361/679.55 |
| 7,667,979 B2 * | 2/2010 | Yun | ...................... | 361/777 |
| 2006/0057458 A1 * | 3/2006 | O'Dea et al. | ...................... | 429/164 |
| 2009/0120674 A1 * | 5/2009 | Chang | ...................... | 174/260 |

* cited by examiner

*Primary Examiner* — Hung S Bui
(74) *Attorney, Agent, or Firm* — Jackson IPG PLLC; Demian K. Jackson

(57) ABSTRACT

A power bank with a replaceable battery core includes a box and an electric power unit. The electric power unit includes one or more battery core and a power management module. A circuit protection module is disposed on a side of the battery core, and a first connecting unit is disposed between the power management module and the circuit protection module. The connecting unit is provided for connecting the power management module to the circuit protection module separately, such that the battery core can be separated from the power management module for a replacement easily when the battery core is damaged or failed.

9 Claims, 7 Drawing Sheets

POWER BANK WITH REPLACEABLE BATTERY CORE

BACKGROUND OF THE INVENTION (a) Field of the Invention

The present invention relates to a power bank with a replaceable battery core, and more particularly to an improved power bank structure, having a connecting unit for connecting a power management module to a circuit protection module, and a battery core that can be separated from the power bank structure anytime.

(b) Description of the Prior Art

As digital electronic products have become an indispensable part of our life, we often use digital electronic products such as digital cameras, digital photography equipments, and even MP4 digital audio/video players regardless of our requirements at home, in office, or on a tour or a business trip. For instance, users usually use digital cameras and MP4 players for fun and personal digital assistants or notebook computers for business, and thus the digital electronic products bring tremendous convenience to users.

As to those portable digital electronic products with no utility power supply, the power supply time of the battery become a big issue, and the battery manufactured by original manufacturers is too expensive and the power supply time is too short, and some of the batteries cannot be recharged during the use of the digital electronic product. Obviously, such digital electronic products cannot maximize their utility, and thus power bank is introduced to overcome this issue.

The structure of a general power bank 1 as shown in FIG. 1 includes a plurality of built-in rechargeable batteries 11, and a transmission line 12 for connecting the power bank 1 and electronic device 2 to discharge or supply electric power of the electronic device 2, wherein the rechargeable battery 11 shows the level of electric power of the rechargeable battery 11 in %, and the circuit protection module 112 is connected to the battery core 111 for controlling the charge/discharge of the battery core 111, and the power management module 113 is connected to the circuit protection module 112 for controlling the charge management (including the charge electricity and the charge temperature, etc).

The battery core 111, the circuit protection module 112 and the power management module 113 have an anode A and a cathode B each, and two metal flakes 13 (such as aluminum foils) or conducting wires are soldered between each anode A and each cathode B for conducting the anode A and the cathode B so as to constitute the electric connection among the battery core 111, the circuit protection module 112 and the power management module 113. However, the soldering process is held at a high temperature, which will damage the battery core 111, the circuit protection module 112 and the power management module 113 easily. After the battery core 111, the circuit protection module 112 and the power management module 113 have gone through the soldering process for several times, the procedure not only involves complicated steps, but also causes poor connection easily. If a permanent soldering method is adopted for connecting the battery core 111, the circuit protection module 112 and the power management module 113, the repair and maintenance of the rechargeable battery 11 will become difficult. In the rechargeable battery 11, the battery core 111 comes with a very short life and a lower cost, but the power management module 113 installs a plurality of controllers for battery charge management, and thus the cost is higher and the life is longer. If it is necessary to replace a damaged battery core 111, the entire rechargeable battery 11 must be replaced, and such arrangement not only wastes a usable power management module 113, but also increases the cost of use.

SUMMARY OF THE INVENTION

Therefore, it is a primary objective of the present invention to provide a power bank with a replaceable battery core to overcome the shortcomings of the prior art.

To achieve the foregoing objective, the present invention provides a power bank with a replaceable battery core, and the power bank comprises a connecting unit for connecting the power management module with the circuit protection module separately, such that the battery core can be separated anytime for replacing the power bank.

The power bank with a replaceable battery core in accordance with the present invention provides a box and an electric power unit, and the electric power unit includes one or more battery cores and a power management module, and a side of the battery core has a circuit protection module, and a first connecting unit is installed between the power management module and the circuit protection module, and the connecting unit is provided for connecting the power management module with the circuit protection module separately, such that when the battery core is damaged or failed, the battery core can be separated from the power management module for a replacement.

DETAILED DESCRIPTION OF THE PREFERRED EMBODIMENTS

Figure 1:
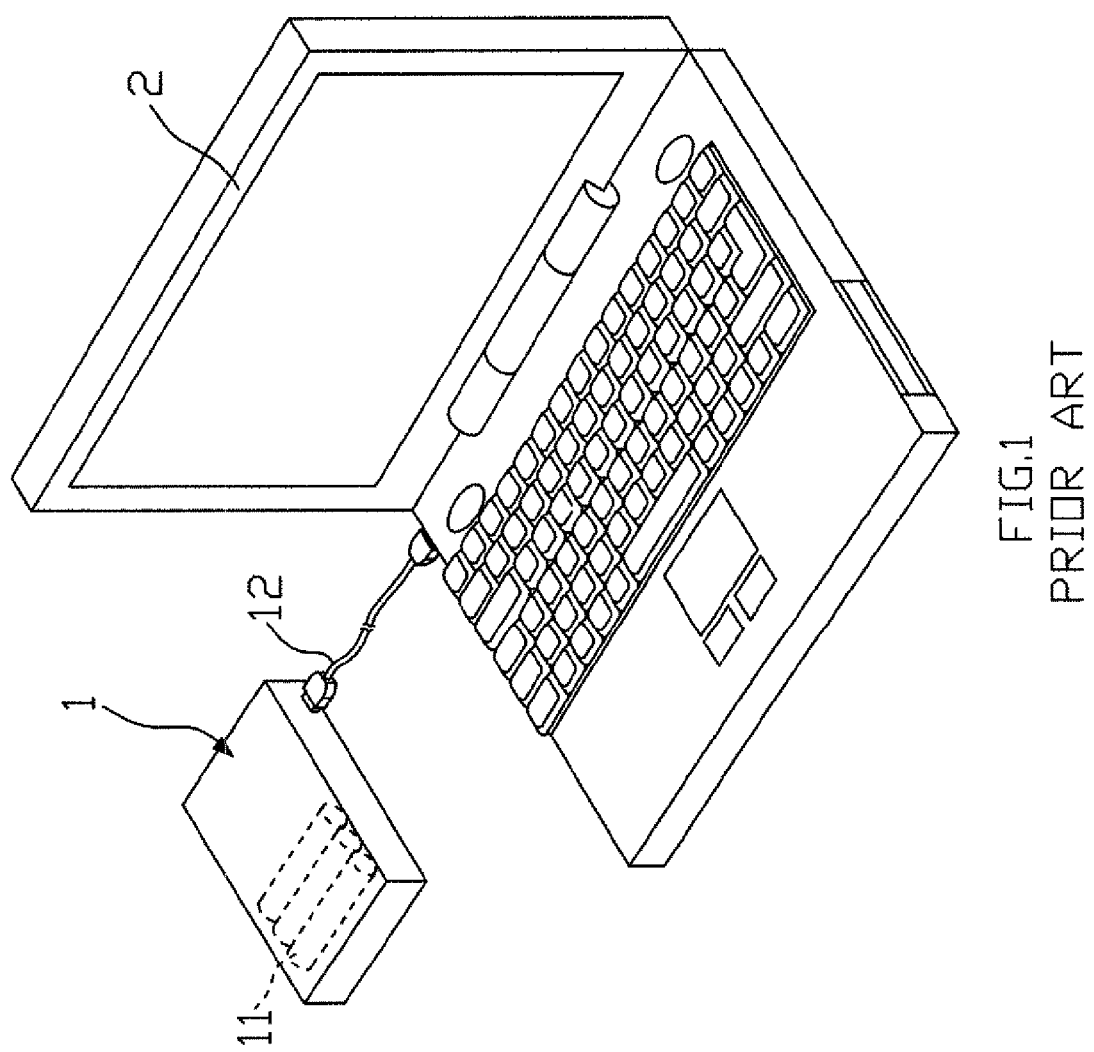
FIG. 1 is a schematic view of using a conventional power bank.
Figure 2:
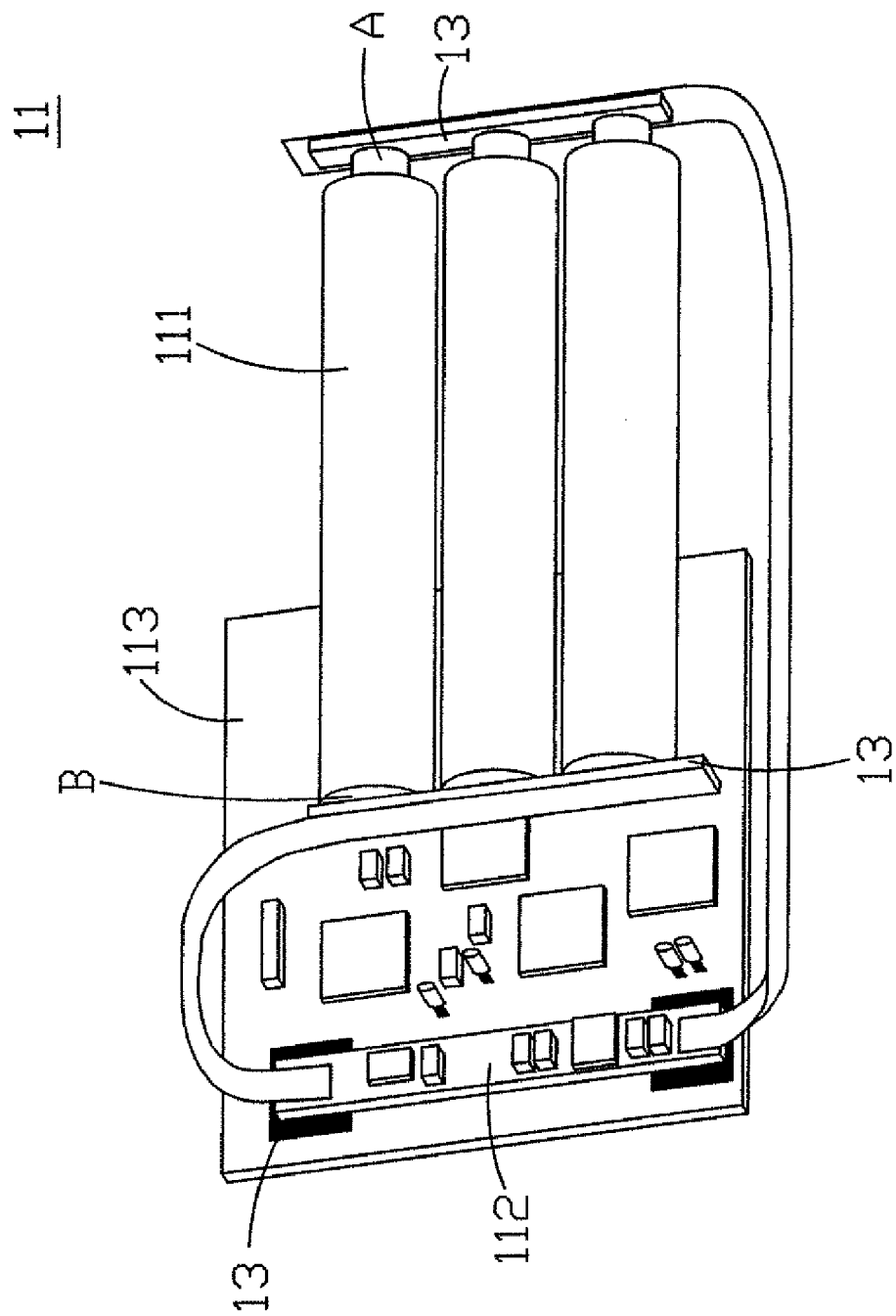
FIG. 2 is a schematic view of a conventional rechargeable battery.
Figure 3:
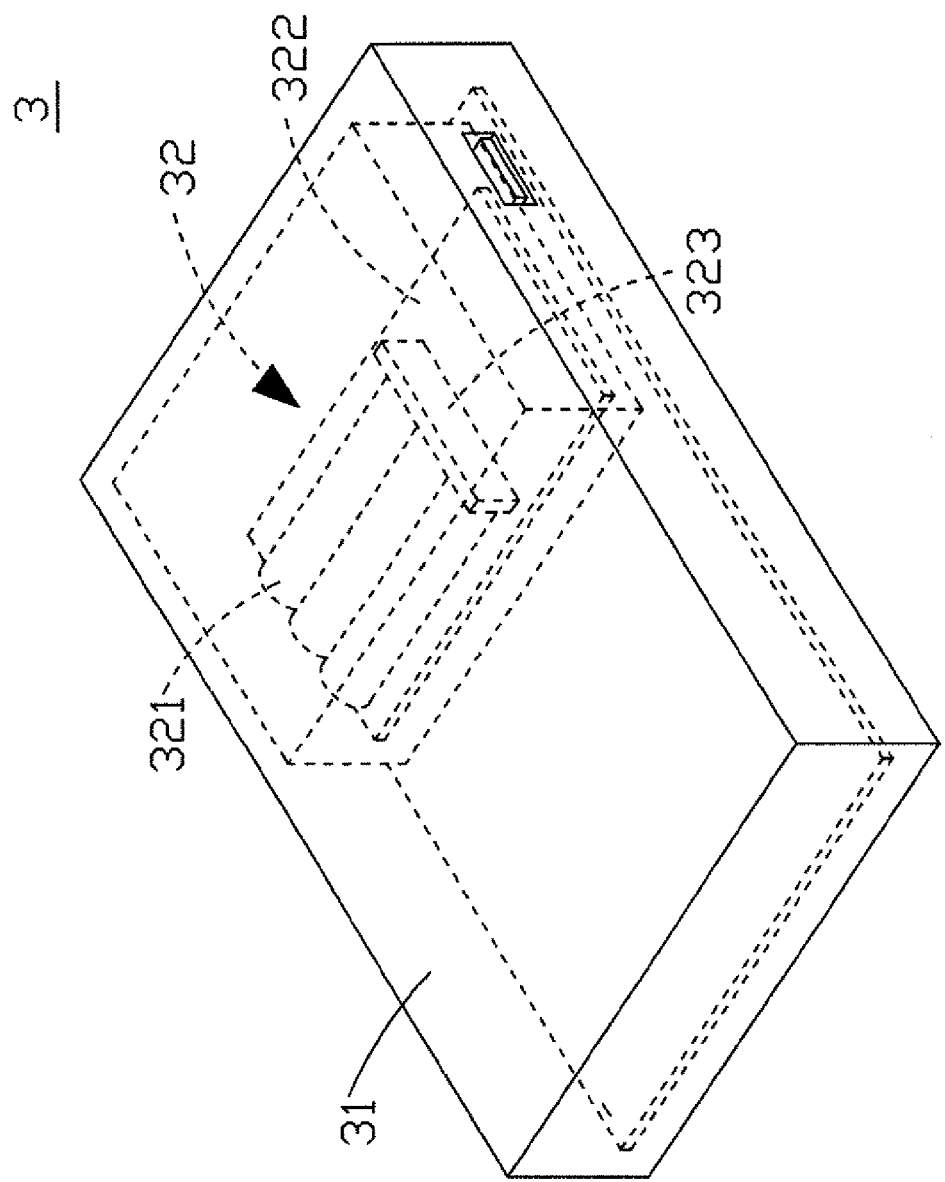
FIG. 3 is a perspective view of a power bank in accordance with a first preferred embodiment of the present invention.
Figure 4:
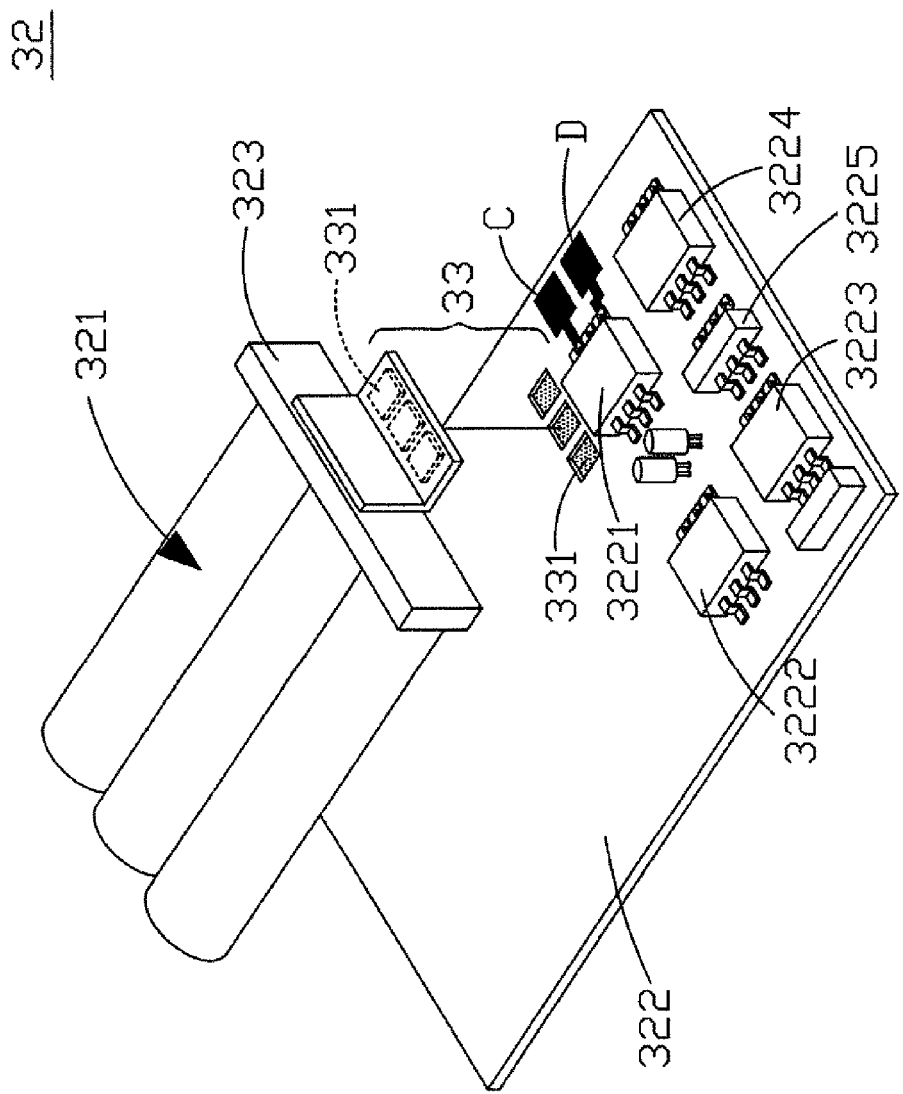
FIG. 4 is a schematic view of an electric power unit in accordance with a first preferred embodiment of the present invention.

With reference to FIGS. 3 and 4 for a power bank with a replaceable battery core in accordance with a first preferred embodiment of the present invention, the power bank 3 comprises a box 31 for installing various different components and an electric power unit 32 installed in the box 31. The electric power unit 32 includes one or more battery cores 321 and a power management module 322, and a side of the battery core 321 has a circuit protection module 323 for controlling the charge/discharge of the battery core 321. The power management module 322 further includes a primary control unit 3221, an electricity comparison unit 3222, a temperature comparison unit 3223, a charge/discharge related information storage unit 3224 and an identification unit 3225. The primary control unit 3221 further includes an input terminal C and an output terminal D for inputting and outputting electric power of the electric power unit 32 respectively.

A first connecting unit 33 is installed between the power management module 322 and the circuit protection module 323 for connecting the power management module 322 with a circuit protection module 323 separately, such that when it is necessary to replace the battery core 321, the first connecting unit 33 can separate the battery core 321, the circuit protection module 323 and the power management module 322 without the need of replacing the power management module 322 at the same time.

In the preferred embodiment as shown in the figure, the first connecting unit 33 can be a plurality of conducting plates 331 responsible for different polarities and installed at corresponding positions of the power management module 322 and the circuit protection module 323 respectively, such that the conducting plates 331 with the same polarity of the power management module 322 and the circuit protection module 323 can be contacted with each other for an electric conduction, and the circuit protection module 323 and the battery core 321 can be electrically connected by using the aforementioned conventional soldering method, such that the battery core 321, the circuit protection module 323 and the power management module 322 are connected in series. The plurality of conducting plates 33 constitute concave and convex forms at the connecting positions to improve a secured connection between the conducting plates 33.

Figure 5:
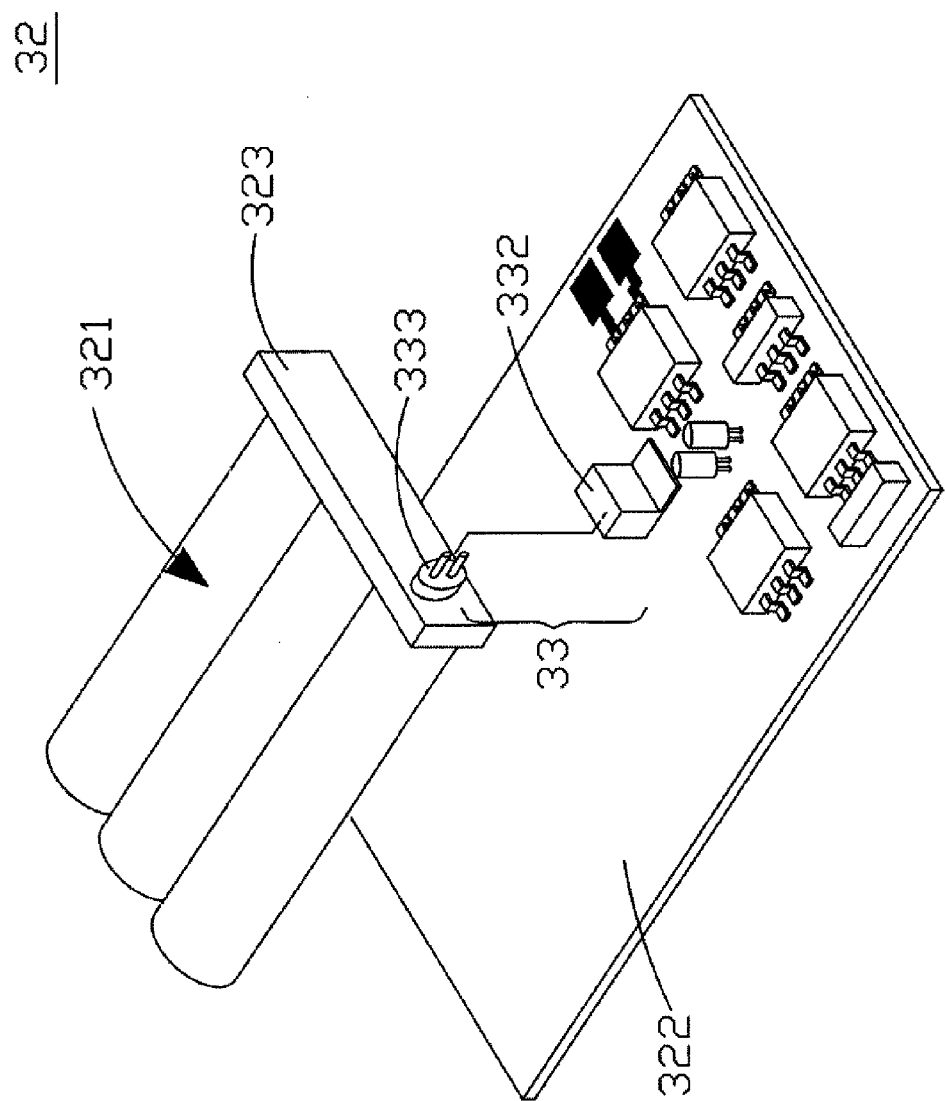
FIG. 5 is a schematic view of an electric power unit in accordance with a second preferred embodiment of the present invention.
Figure 6:
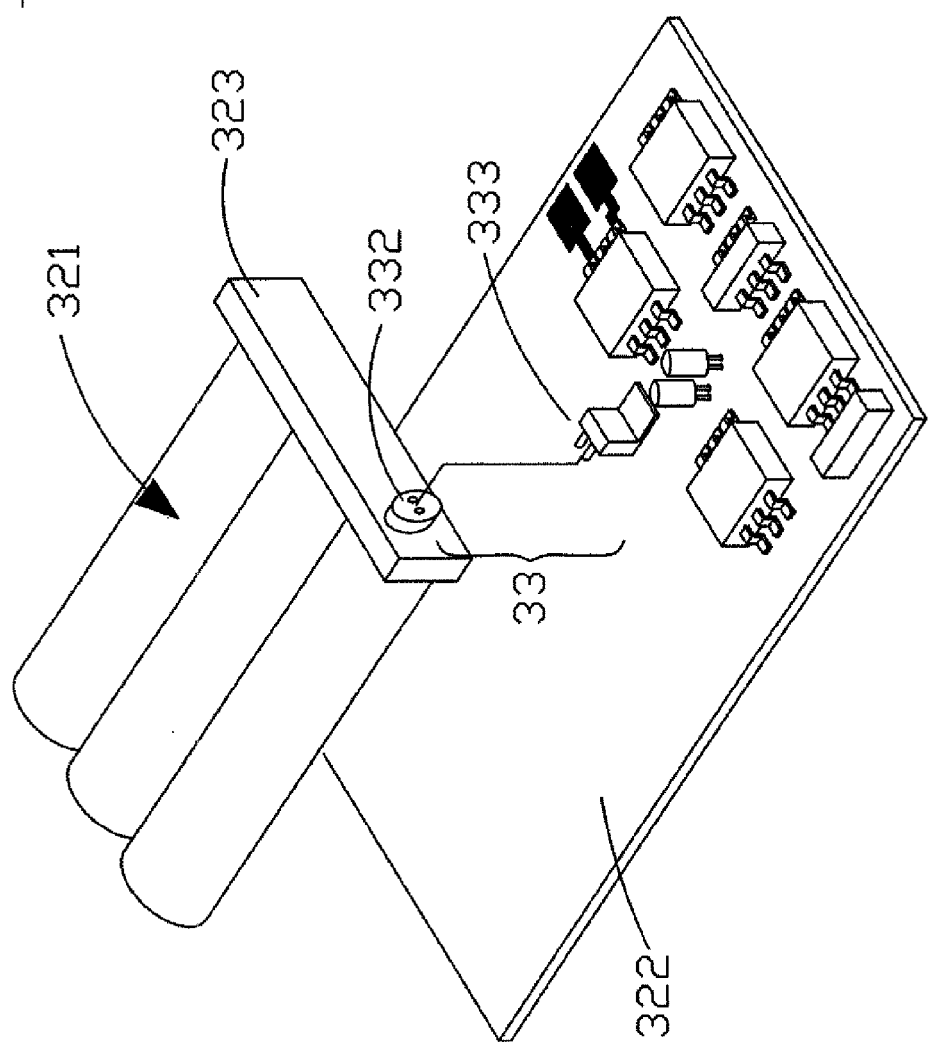
FIG. 6 is an exploded view of an electric power unit in accordance with a third preferred embodiment of the present invention.

Of course, the first connecting unit 33 can be of a structural form having a socket and a plug, and the socket 332 is installed on the power management module 322, and the plug 333 is installed on the circuit protection module 323 as shown in FIG. 5, or the socket 332 is installed on the circuit protection module 323, and the plug 333 is installed on the power management module 322 as shown in FIG. 6, so that the power management module 322 and the circuit protection module 323 can be separated or connected with each other anytime.

Figure 7:
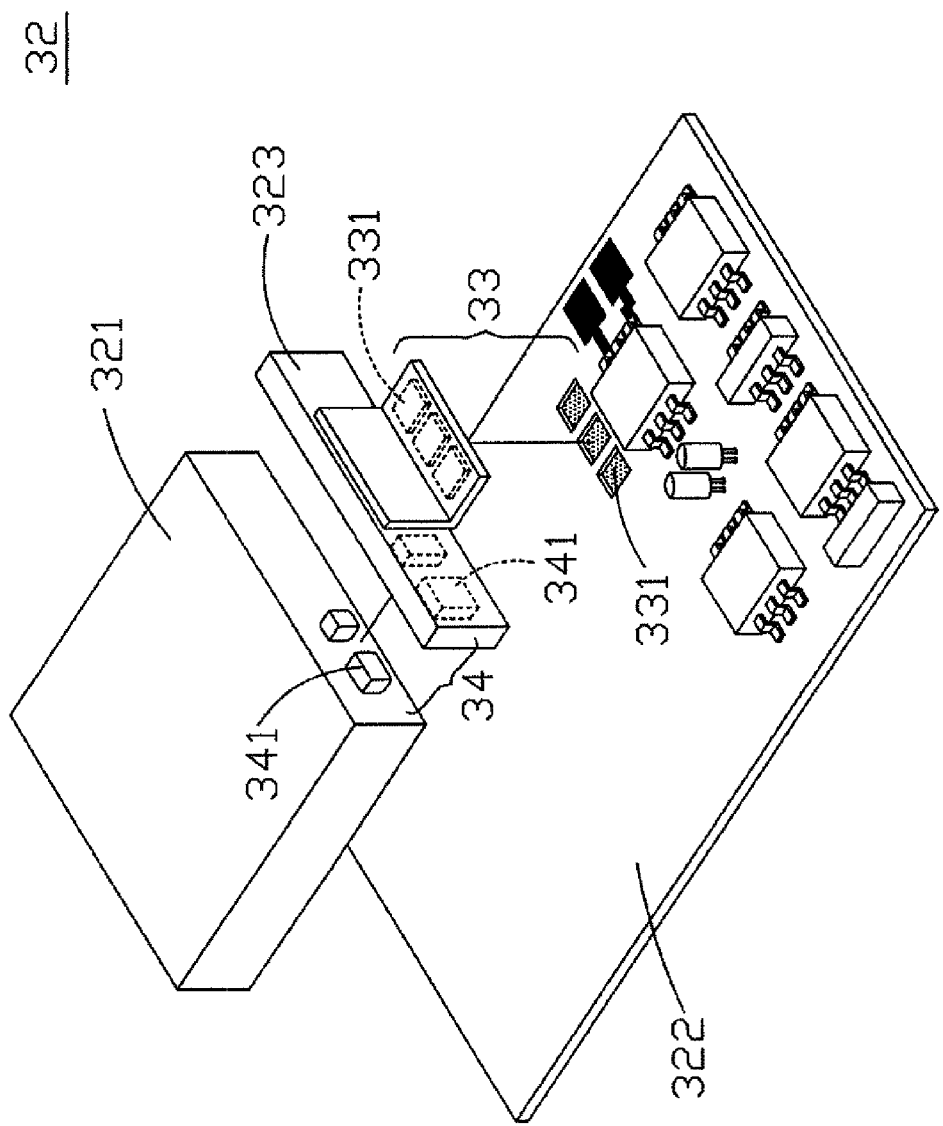
FIG. 7 is an exploded view of an electric power unit in accordance with a fourth preferred embodiment of the present invention.

Further, a second connecting unit 34 is installed between the battery core 321 and the circuit protection module 323 as shown in FIG. 7, and the second connecting unit 34 is provided for connecting the battery core 321 with the circuit protection module 323 separately. Of course, the second connecting unit 34 can be a plurality of conducting plates 341 similar to the aforementioned embodiment, or can be a structural form having a socket and a plug (not shown in the figure) for separating or connecting the battery core 321 and the circuit protection module 323 anytime.

Compared with the prior art, the present invention has the following advantages:

1. The connecting unit installed between the circuit protection module and the power management module provides an easy way of separating and connecting the two modules anytime, and the battery core is mounted onto the circuit protection module, so that users can replace the battery core and the circuit protection module without replacing a high-priced power management module.

2. Another connecting unit installed between the circuit protection module and the battery core also provides an easy way of separating and connecting the module and battery core, so that users can replace the battery core alone.

3. The power management module has an identification unit, such that when a user replaces a new battery core, the user can identify whether or not the battery core fits the identification unit, such as identifying whether or not the battery core is manufactured by the same manufacturer.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

I claim:

1. A power bank with a replaceable battery core, comprising:
a box, for containing various components;
an electric power unit, installed in the box, and including one or more battery cores and a power management module and a second connecting unit, disposed between the battery core and the circuit protection module, configured to releasably connect the battery core to the circuit protection module, and having a circuit protection module disposed on a side of the battery core, and a first connecting unit disposed between the power management module and the circuit protection module, wherein the first connecting unit is installed between the power management module and the circuit protection module, the first connecting unit being configured to releasably connect the power management module to the circuit protection module,
wherein the second connecting unit, disposed between the battery core and the circuit protection module, is configured to releasably connect the battery core to the circuit protection module.

2. The power bank with a replaceable battery core of claim 1, wherein the first connecting unit is comprised of a plurality of conducting plates, and the conducting plates are installed at corresponding positions of the power management module and the circuit protection module respectively.

3. The power bank with a replaceable battery core of claim 1, wherein the first connecting unit comes with a structural form having a socket and a plug, and the socket is installed on the power management module, and the plug is installed on the circuit protection module.

4. The power bank with a replaceable battery core of claim 1, wherein the first connecting unit comes with a structural form having a socket and a plug, and the socket is installed on the circuit protection module, and the plug is installed on the power management module.

5. The power bank with a replaceable battery core of claim 1, wherein the second connecting unit is comprised of a plurality of conducting plates installed at corresponding positions of the battery core and the circuit protection module respectively.

6. The power bank with a replaceable battery core of claim 1, wherein the second connecting unit comes with a socket-and-plug structural form.

7. The power bank with a replaceable battery core of claim 1, wherein the power management module further includes a primary control unit, an electricity comparison unit, a temperature comparison unit and a charge/discharge related information storage unit.

8. The power bank with a replaceable battery core of claim 7, wherein the primary control unit further includes an input terminal and an output terminal.

9. The power bank with a replaceable battery core of claim 1, wherein the power management module further includes an identification unit.

* * * * *